(12) United States Patent
You et al.

(10) Patent No.: US 11,576,494 B1
(45) Date of Patent: Feb. 14, 2023

(54) MULTIFUNCTIONAL COLLAPSIBLE STOOL

(71) Applicant: Yiwu Locyop Household Product co., Ltd., Zhejiang (CN)

(72) Inventors: Wenbiao You, Zhejiang (CN); Changwei Long, Zhejiang (CN)

(73) Assignee: Yiwu Locyop Household Product co., Ltd., Yiwu (CN)

( * ) Notice: Subject to any disclaimer, the term of this patent is extended or adjusted under 35 U.S.C. 154(b) by 0 days.

(21) Appl. No.: 17/488,832

(22) Filed: Sep. 29, 2021

(30) Foreign Application Priority Data

Aug. 18, 2021 (CN) .......................... 202110946372.3

(51) Int. Cl.
| | | |
|---|---|---|
| *A47C 3/40* | (2006.01) | |
| *A47C 3/20* | (2006.01) | |
| *A47C 4/52* | (2006.01) | |
| *A47C 9/10* | (2006.01) | |
| *A47K 11/04* | (2006.01) | |

(Continued)

(52) U.S. Cl.
CPC .................. *A47C 3/40* (2013.01); *A47C 3/16* (2013.01); *A47C 3/20* (2013.01); *A47C 3/22* (2013.01); *A47C 3/34* (2013.01); *A47C 4/52* (2013.01); *A47C 9/00* (2013.01); *A47C 9/10* (2013.01); *A47K 11/04* (2013.01); *B65D 21/086* (2013.01); *A47C 3/18* (2013.01)

(58) Field of Classification Search
CPC .... A47C 3/16; A47C 3/20; A47C 3/22; A47C 3/40; A47C 4/52; A47C 7/628; A47C 9/00; A47C 9/10; A47C 12/00; A47C 13/00; A47K 11/04; A47K 11/06; A47K 11/105; B65F 1/16; B65F 2001/1653; B65F 2220/1063; B65F 2220/1066; B65D 21/086
USPC ..... 297/17, 118, 188.08, 188.09, 188.1, 462, 297/129; 220/8, 666; 4/497, 483, 484
See application file for complete search history.

(56) References Cited

U.S. PATENT DOCUMENTS

| 284,852 A | * | 9/1883 | Hughes | .................. | A47K 11/04 |
| | | | | | 4/476 |
| 1,663,966 A | * | 3/1928 | Cotton | .................. | A47K 11/06 |
| | | | | | 220/9.3 |

(Continued)

FOREIGN PATENT DOCUMENTS

JP 2020043889 A * 3/2020

*Primary Examiner* — Robert Canfield
(74) *Attorney, Agent, or Firm* — Dragon Sun Law Firm, PC; Jinggao Li; Nathaniel Perkins

(57) ABSTRACT

The present disclosure provides a multifunctional collapsible stool including a collapsible stool body. An upper end and a lower end of the collapsible stool body include an upper seat and a lower seat respectively, the collapsible stool body includes a cavity, and an upper cover capable of opening and closing the cavity is mounted on the upper seat. A rear end of the upper seat is rotatably connected to a backup ring located between the upper seat and the upper cover. A rear end of the upper cover is rotatably connected to the rear end of the upper seat. The multifunctional collapsible stool designed this way can be utilized as a closestool or a garbage bin with the upper cover opened in addition to being utilized as a stool. Further, the multifunctional collapsible stool may also be utilized for storage. With these functions, the use requirements of more consumers can be satisfied.

3 Claims, 5 Drawing Sheets

(51) Int. Cl.
*B65D 21/08* (2006.01)
*A47C 3/34* (2006.01)
*A47C 3/22* (2006.01)
*A47C 3/16* (2006.01)
*A47C 9/00* (2006.01)
*A47C 3/18* (2006.01)

(56) References Cited

U.S. PATENT DOCUMENTS

| | | | | |
|---|---|---|---|---|
| 3,329,298 A | * | 7/1967 | Demas | B65D 21/086 |
| | | | | 220/8 |
| 3,602,924 A | * | 9/1971 | Kneisley | A47B 45/00 |
| | | | | 4/315 |
| 3,715,996 A | * | 2/1973 | Rolfshus | A47C 9/00 |
| | | | | D6/692.3 |
| 4,046,348 A | * | 9/1977 | Goodwin | A47C 3/40 |
| | | | | 248/188.5 |
| 4,979,242 A | * | 12/1990 | Maggio | E04H 1/1244 |
| | | | | 135/901 |
| 5,960,983 A | * | 10/1999 | Chan | B65F 1/02 |
| | | | | 220/666 |
| 6,385,790 B1 | * | 5/2002 | Abraham | A47K 11/02 |
| | | | | 4/479 |
| D878,067 S | * | 3/2020 | You | D6/353 |
| 10,611,564 B1 | * | 4/2020 | Stravitz | B65F 1/10 |
| D918,609 S | * | 5/2021 | Zhao | D6/353 |
| D946,719 S | * | 3/2022 | Niu | D23/299 |
| 11,369,239 B2 | * | 6/2022 | Yang | A47K 11/04 |
| D957,834 S | * | 7/2022 | Sun | D6/353 |
| D959,865 S | * | 8/2022 | Dai | D6/352 |
| 2008/0184470 A1 | * | 8/2008 | Veroni | A47K 11/06 |
| | | | | 4/300.3 |
| 2010/0176126 A1 | * | 7/2010 | Shikano | B65F 1/08 |
| | | | | 220/23.91 |
| 2013/0042583 A1 | * | 2/2013 | Wardle | B65F 1/068 |
| | | | | 53/473 |
| 2013/0075406 A1 | * | 3/2013 | Sakaguchi | B65F 1/06 |
| | | | | 220/495.08 |
| 2015/0253055 A1 | * | 9/2015 | Tsui | B65D 15/02 |
| | | | | 280/655 |
| 2020/0015592 A1 | * | 1/2020 | Zaifman | A47C 7/004 |
| 2022/0061534 A1 | * | 3/2022 | Sun | A47C 7/725 |
| 2022/0087427 A1 | * | 3/2022 | Sun | A47C 3/40 |

\* cited by examiner

MULTIFUNCTIONAL COLLAPSIBLE STOOL

CROSS-REFERENCE TO RELATED APPLICATION

This application claims priority from the Chinese patent application 202110946372.3 filed Aug. 18, 2021, the content of which is incorporated herein in the entirety by reference.

TECHNICAL FIELD

The present disclosure relates to a collapsible stool, and in particular to a multifunctional collapsible stool.

BACKGROUND

Conventionally, a collapsible stool or a telescoping stool typically includes a collapsible stool body, and the collapsible stool body includes a lower seat, an upper seat, and a plurality of cylinders sleeved up and down in sequence between the lower seat and the upper seat. The cylinder is provided with a plurality of locking mechanisms such that the collapsible stool can be adjusted in height for use. As disclosed by Chinese patents CN210383300U, CN213605383U and CN210383292U and the like, the telescoping stools are seldom utilized for purposes other than as a stool and cannot satisfy use requirements of different consumers. Therefore, the telescoping stools need to be further improved.

SUMMARY

In order to solve the above defects in the prior art, the present disclosure provides a multifunctional collapsible stool.

The present disclosure employs the following technical solution: there is provided a multifunctional collapsible stool including a collapsible stool body. An upper end and a lower end of the collapsible stool body include an upper seat and a lower seat respectively, the collapsible stool body includes a cavity, and an upper cover configured to cover and uncover the cavity is mounted on the upper seat.

Further, a rear end of the upper seat is rotatably connected to a backup ring disposed between the upper seat and the upper cover.

Still further, a rear end of the upper cover is rotatably connected to the rear end of the upper seat.

Still further, the rear end of the upper seat includes a connection seat with which a rear end of the backup ring and the rear end of the upper cover are both hinged.

Still further, a front end of the upper cover is connected to the upper seat via a buckle.

Still further, the front end of the upper cover is provided with the buckle, and a buckling block mated with the buckle is disposed on an outer side wall of a front end of the upper seat.

Still further, a plurality of springs disposed inside the cavity are mounted between the upper seat and the lower seat.

Still further, a spring clip is mounted to the bottom of the upper seat.

Furthermore, the upper seat is annular, a locking hook is mounted to the upper seat, and a locking ring fitted with the locking hook is mounted on the lower seat.

The multifunctional collapsible stool according to the present disclosure includes the following beneficial effects: in addition to being utilized as a stool, the multifunctional collapsible stool may also be utilized as a closestool or garbage bin after the upper cover is opened. Further, the multifunctional collapsible stool may also be utilized for storage. With these functions, the multifunctional collapsible stool can satisfy the use requirements of more consumers.

BRIEF DESCRIPTIONS OF THE DRAWINGS

Figure 1:
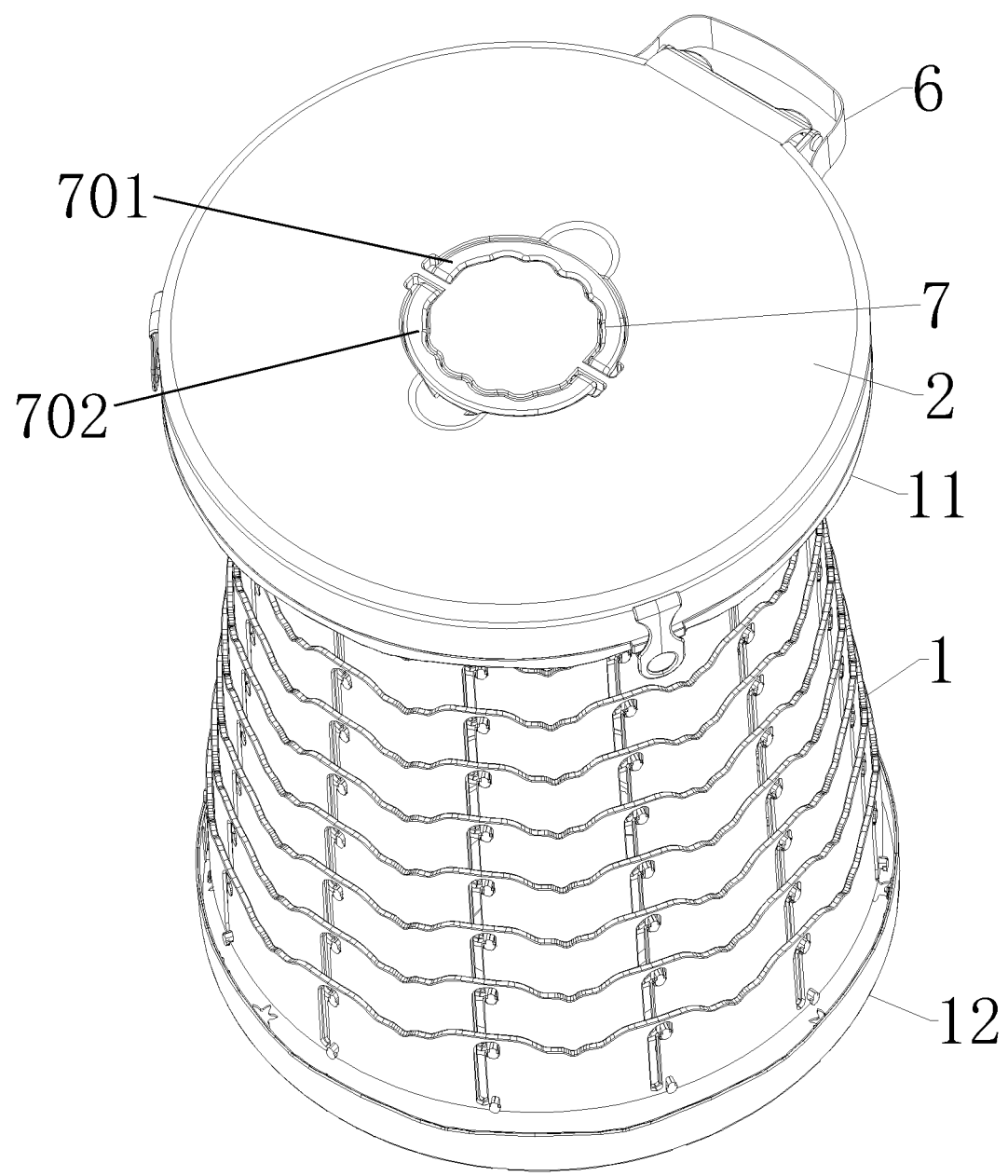
FIG. 1 is a schematic diagram of an entire structure of a multifunctional collapsible stool in an unfolded state with an upper cover in a closed state according to the present disclosure.

Numerals of drawings are described below: 1—collapsible stool body, 11—upper seat, 111—connection seat, 112—buckling block, 12—lower seat, 13—cavity, 2—upper cover, 21—buckle, 3—backup ring, 4—spring, 5—spring clip, 6—strap, 7—handle, 8—locking hook, and 9—locking ring.

DETAILED DESCRIPTIONS OF EMBODIMENTS

To fully describe the technical solution of the present disclosure, non-limiting feature descriptions are included in combination with the accompanying drawings.

As shown in FIGS. 1-4, there is provided a multifunctional collapsible stool, including a collapsible stool body 1. An upper end and a lower end of the collapsible stool body 1 include an upper seat 11 and a lower seat 12, respectively. A plurality of cylinders nested in sequence are disposed between the upper seat 11 and the lower seat 12, and the cylinders are provided with a plurality of locking mechanisms. The collapsible stool body 1 includes a cavity 13 and an upper cover 2 configured to cover and uncover the cavity 13 is mounted on the upper seat 11.

Figure 3:
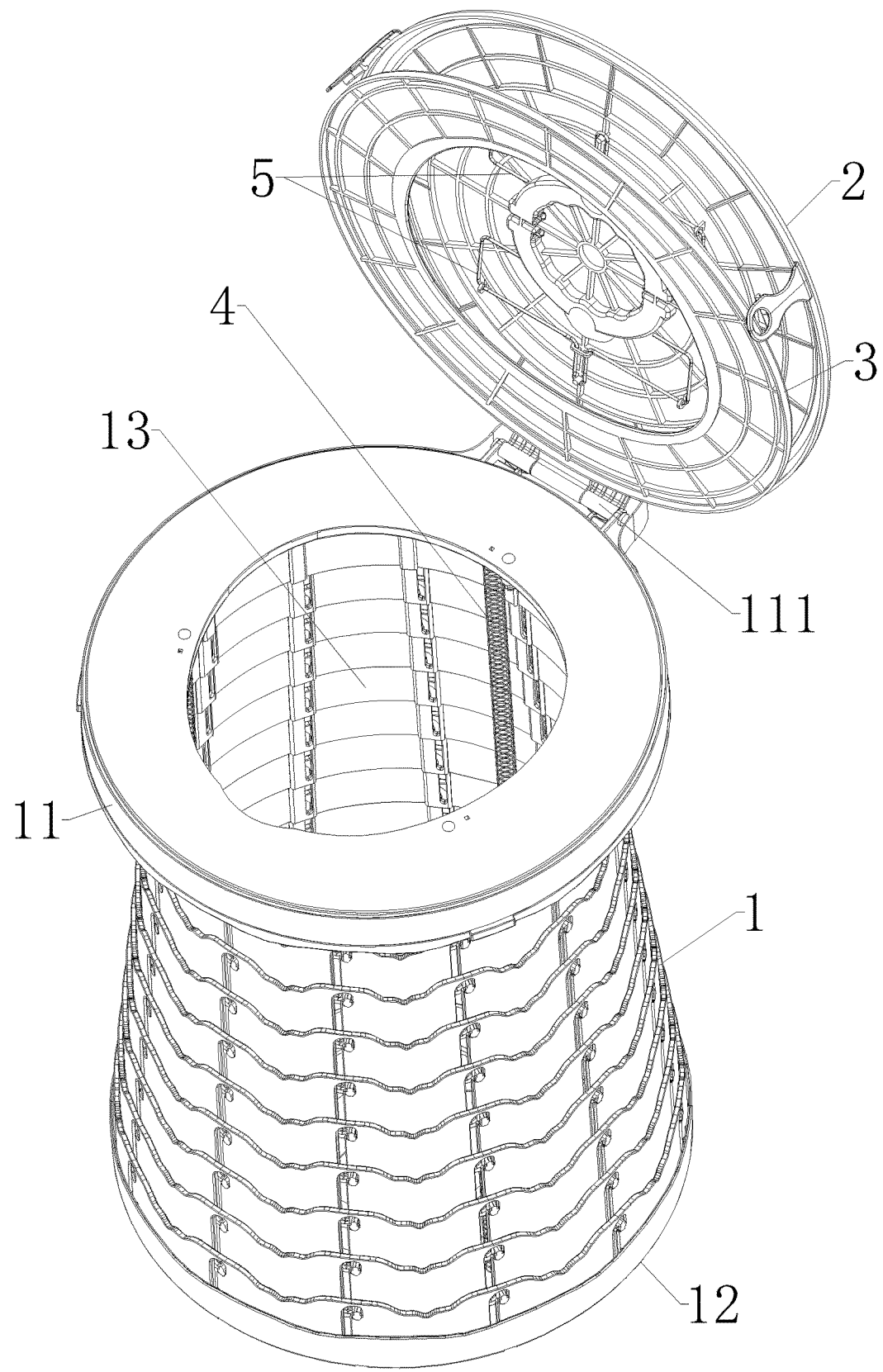
FIG. 3 is a schematic diagram of an entire structure of a multifunctional collapsible stool in an unfolded state with an upper cover in an opened state according to the present disclosure.
Figure 4:
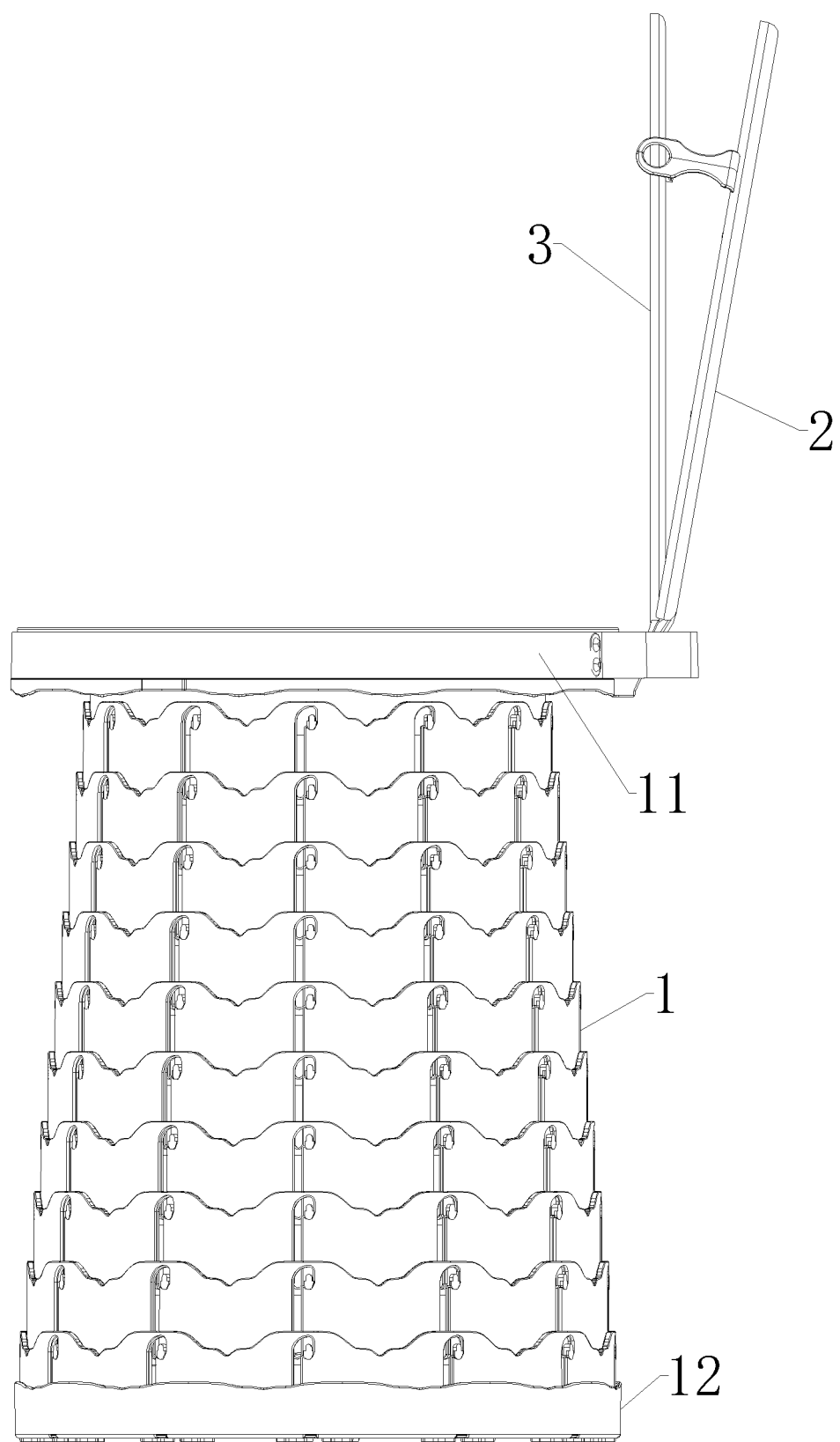
FIG. 4 is a right view of a multifunctional collapsible stool in an unfolded state with an upper cover in an opened state according to the present disclosure.

As shown in FIGS. 3-4, a rear end of the upper seat 11 is rotatably connected to a backup ring 3 disposed between the top of the upper seat 11 and the bottom of the upper cover 2. When the upper cover 2 is in a closed state, the upper seat 11, the backup ring 3 and the upper cover 2 are distributed sequentially from bottom to top.

As shown in FIG. 3, in order to facilitate opening the upper cover 2 and the backup ring 3, a rear end of the upper cover 2 is rotatably connected to the rear end of the upper seat 11. The rear end of the upper seat 11 includes a connection seat 111 with which a rear end of the backup ring 3 and the rear end of the upper cover 2 are both hinged.

Figure 2:
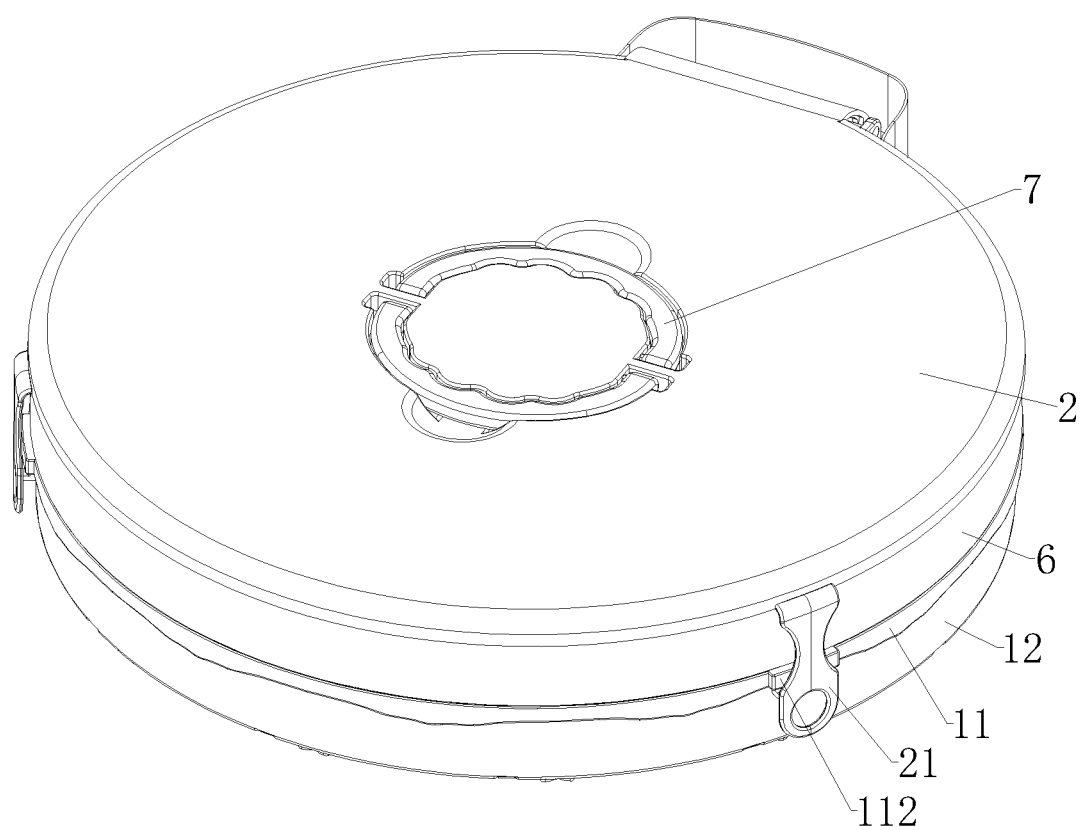
FIG. 2 is a schematic diagram of an entire structure of a multifunctional collapsible stool in a folded state with an upper cover in a closed state according to the present disclosure.

As shown in FIG. 2, a front end of the upper cover 2 is connected to the upper seat 11 via a buckle such that the upper cover 2 can be stably fixed on the upper seat 11. Specifically, the front end of the upper cover 2 includes a buckle 21, a buckling block 112 mated with the buckle 21 is disposed at an outer side wall of a front end of the upper seat 11, and a lower end of the buckle 21 is configured to be coupled to a downwardly-opened groove (not shown) of the buckling block 112.

As shown in FIG. 3, to enable the top of the upper seat 11 to be in smooth connection with the backup ring 3, the upper seat 11 is annularly shaped. The upper seat 11 is in communication with the cavity 13, and the top of the upper seat 11 includes a plane in connection with the backup ring 3.

Figure 5:
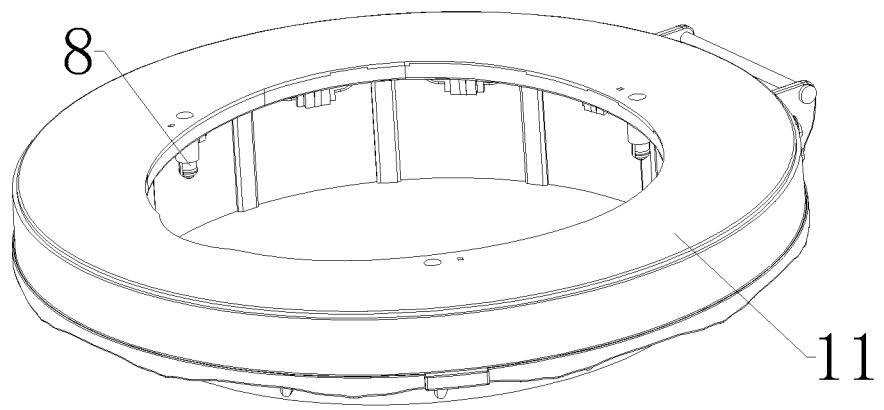
FIG. 5 is a structural schematic diagram of an upper seat and a lower seat according to the present disclosure.
Figure 5:
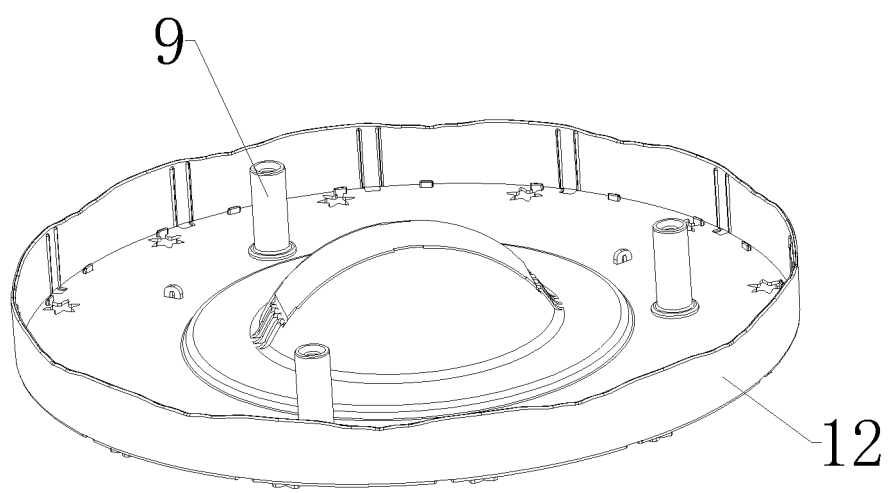

As shown in FIG. 5, locking hooks 8 are mounted to the upper seat 11, and locking rings 9 fitted with the locking hooks 8 are mounted to the lower seat 12. The numbers of the locking hooks 8 and the locking rings 9 are preferably three respectively. When the multifunctional collapsible stool is in a folded state, the locking hooks 8 are fitted into the locking rings 9 to maintain the folded state.

As shown in FIG. 3, a plurality of springs 4 disposed inside the cavity 13 are mounted between the upper seat 11 and the lower seat 12. The number of the springs 4 is preferably three, and the three springs 4 are disposed at an edge of the cavity 13.

As shown in FIG. 3, a spring clip 5 is mounted to the bottom of the cover 2. The number of the spring clips 5 is preferably two. A garbage bag may be hung on the spring clip 5. The spring clip 5 is detachably mounted at the bottom of the cover 2, and therefore, the spring clip 5 may be dismounted if not utilized.

A strap 6 is wound on an outer side of the upper seat 11 of the collapsible stool body 1, and a handle 7 is disposed at the top of the upper seat 11 and the bottom of the lower seat 12, respectively, wherein each handle 7 includes a first component 701 and a second component 702. By including the strap 6 and the handle 7, the multifunctional collapsible stool may easily be picked up and carried.

The multifunctional collapsible stool may be utilized as a stool. When the upper cover 2 is in a closed state, people may sit directly on the top of the upper cover 2.

Furthermore, the multifunctional collapsible stool may be utilized as a closestool. In use, the upper cover 2 and the backup ring 3 are opened, a garbage gag is placed on the collapsible stool body 1 and protrudes into the cavity 13, and the backup ring 3 is placed on the top of the upper seat 11. As such, people can sit on the backup ring 3 for toileting and may cover the collapsible stool body 1 with the upper cover 2 after use.

The multifunctional collapsible stool may also be utilized as a garbage bin. In use, a garbage bag is placed on the collapsible stool body 1 and protrudes into the cavity 13, and is pressed using the backup ring 3. As such, the multifunctional collapsible stool can serve as a garbage bin while the upper cover 2 is in an opened state.

The multifunctional collapsible stool may also be utilized to store articles. Articles may be placed in the cavity 13 of the collapsible stool body 1. After the upper cover 2 is closed, the articles inside the cavity 13 will not easily fall out of the collapsible stool.

The descriptions disclosed herein merely describe several preferred embodiments of the present disclosure and do not limit the scope of protection of the present disclosure. Any simple modifications and equivalent structural changes made according to the specification and the accompanying drawings of the present disclosure shall all fall within the scope of protection of the present disclosure.

What is claimed is:

1. A multi-functional collapsible stool, comprising:
    a collapsible stool body having a circular upper end and a circular lower end, the circular upper end comprising a circular upper seat and the circular lower end comprising a circular lower seat, wherein the collapsible stool body comprises a cavity,
    a circular upper cover configured to cover and uncover the cavity and mounted on the circular upper seat;
    a plurality of cylinders nested in sequence and disposed between the circular upper seat and the circular lower seat; wherein each of the plurality of cylinders comprises a top, waved edge; the plurality of cylinders are provided with a plurality of locking mechanisms; each of the plurality of locking mechanisms comprises an opening having a vertical portion, and a horizontal portion disposed on a right side of the vertical portion; the plurality of cylinders are configured to be locked or unlocked by the plurality of locking mechanisms; the plurality of cylinders comprises at least a first cylinder connected to the circular upper seat and a second cylinder connected to the circular lower seat;
    a strap wound on an outer side of the circular upper seat of the collapsible stool body;
    a first handle disposed at a center of a top of the circular upper end and a second handle disposed at a center of a bottom of the circular lower end, wherein the first handle and the second handle each comprise a first semicircular component and a second semicircular component opposite to the first semicircular component, wherein the first semicircular component and the second semicircular component each comprise two hinges;
    locking hooks mounted to the circular upper seat; and
    locking rings fitted with the locking hooks and mounted to the circular lower seat; wherein the numbers of the locking hooks and the locking rings are three; the three locking hooks are equally distributed on a bottom of the circular upper seat; the three locking rings are equally distributed on a top of the circular lower seat; and when the multifunctional collapsible stool is in a collapsed state, the locking hooks are fitted into the locking rings to maintain the folded state; wherein
    to facilitate opening the circular upper cover and a circular backup ring, a rear end of the circular upper cover is rotatably connected to the rear end of the circular upper seat, the rear end of the circular upper seat includes a connection seat with which a rear end of the circular backup ring and the rear end of the circular upper cover are both hinged;
    when the circular upper cover is in a closed state, the circular upper seat, the circular backup ring and the circular upper cover are distributed sequentially from bottom to top;
    a front end of the circular upper cover is connected to the circular upper seat via two buckles; and
    the front end of the circular upper cover is provided with the two buckles, and two buckling blocks configured to be mated with the two buckles are disposed on an outer side wall of a front end of the circular upper seat.

2. The multifunctional collapsible stool of claim 1, wherein a plurality of springs disposed inside the cavity are mounted between the circular upper seat and the circular lower seat.

3. The multifunctional collapsible stool of claim 1, wherein a spring clip is mounted to the bottom of the circular upper cover.

* * * * *